(12) United States Patent
Huber et al.

(10) Patent No.: US 10,677,155 B2
(45) Date of Patent: Jun. 9, 2020

(54) SWITCH VALVE FOR CONTROLLING A HYDRAULIC FLUID FLOW AND CONNECTING ROD FOR A VARIABLE COMPRESSION INTERNAL COMBUSTION ENGINE WITH A SWITCH VALVE

(71) Applicant: ECO Holding 1 GmbH, Marktheidenfeld (DE)

(72) Inventors: David Huber, Aschaffenburg (DE); Dietmar Schulze, Muenzenberg (DE); Alexander Mudra, Marktheidenfeld (DE); Christian Jung, Roden (DE)

(73) Assignee: ECO Holding 1 GmbH, Marktheldenfeld (DE)

( * ) Notice: Subject to any disclaimer, the term of this patent is extended or adjusted under 35 U.S.C. 154(b) by 0 days.

(21) Appl. No.: 16/120,374

(22) Filed: Sep. 3, 2018

(65) Prior Publication Data
US 2019/0072031 A1 Mar. 7, 2019

(30) Foreign Application Priority Data

Sep. 4, 2017 (DE) .......................... 10 2017 120 255
Mar. 26, 2018 (DE) .......................... 10 2018 107 108

(51) Int. Cl.
*F02B 75/04* (2006.01)
*F01B 31/14* (2006.01)
(Continued)

(52) U.S. Cl.
CPC ............ *F02B 75/045* (2013.01); *F01B 31/14* (2013.01); *F16C 7/06* (2013.01); *F16K 11/0704* (2013.01); *F16C 23/10* (2013.01); *F16C 2360/22* (2013.01)

(58) Field of Classification Search
CPC .... F02B 75/045; F01B 31/14; F16K 11/0704; F16C 7/06; F16C 2360/22; F16C 23/10; F16C 7/02; F15B 13/02
See application file for complete search history.

(56) References Cited

U.S. PATENT DOCUMENTS

2015/0260094 A1* 9/2015 Wittek .................. F02B 75/045
123/48 B
2016/0245331 A1 8/2016 Schaffrath et al.

FOREIGN PATENT DOCUMENTS

CN 106715988 5/2017
DE 102012112461 6/2014
(Continued)

*Primary Examiner* — Jacob M Amick
*Assistant Examiner* — Charles Brauch
(74) *Attorney, Agent, or Firm* — Von Rohrscheidt Patents

(57) ABSTRACT

A switch valve for controlling a hydraulic fluid flow, the switch valve comprising a tapping element that is arranged in a valve housing, wherein the tapping element is displaceable into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the tapping element is limited, wherein the interlocking element is at least partially arranged in a recess of the tapping element, wherein the valve housing includes a first groove that is oriented in an axial direction of the valve housing and limited in the axial direction.

13 Claims, 8 Drawing Sheets

(51) Int. Cl.
*F16C 7/06* (2006.01)
*F16K 11/07* (2006.01)
*F16C 23/10* (2006.01)

(56) References Cited

FOREIGN PATENT DOCUMENTS

| | | | |
|---|---|---|---|
| DE | 102012112461 A1 * | 6/2014 | |
| DE | 102012112461 A1 | 6/2014 | |
| DE | 102013105389 | 11/2014 | |
| DE | 102015202051 | 8/2016 | |
| DE | 102015202051 A1 | 8/2016 | |
| DE | 102015202056 | 8/2016 | |
| DE | 102015202065 | 8/2016 | |
| DE | 102015111175 A1 | 9/2016 | |
| DE | 102015203417 | 9/2016 | |
| DE | 102015203417 A1 | 9/2016 | |
| DE | 102016114953 A1 | 12/2017 | |
| DE | 102016115730 A1 | 3/2018 | |
| WO | WO2014166636 | 10/2014 | |
| WO | WO2016096281 | 6/2016 | |

\* cited by examiner

"Z"

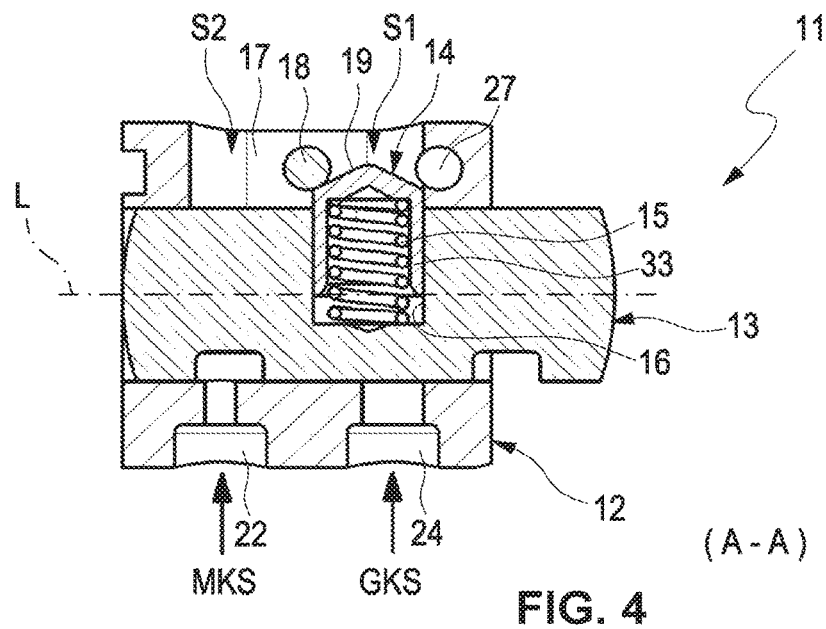
FIG. 4 (A-A)
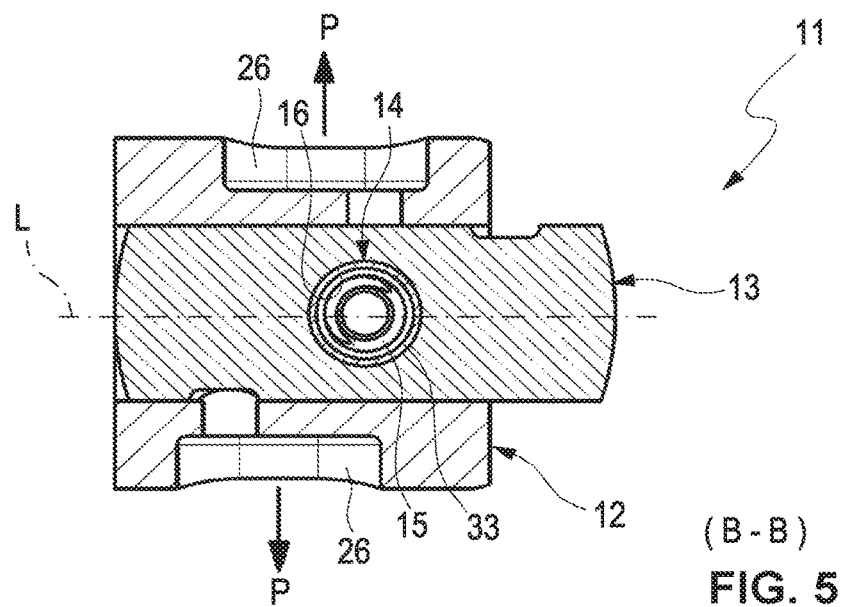
FIG. 5 (B-B)
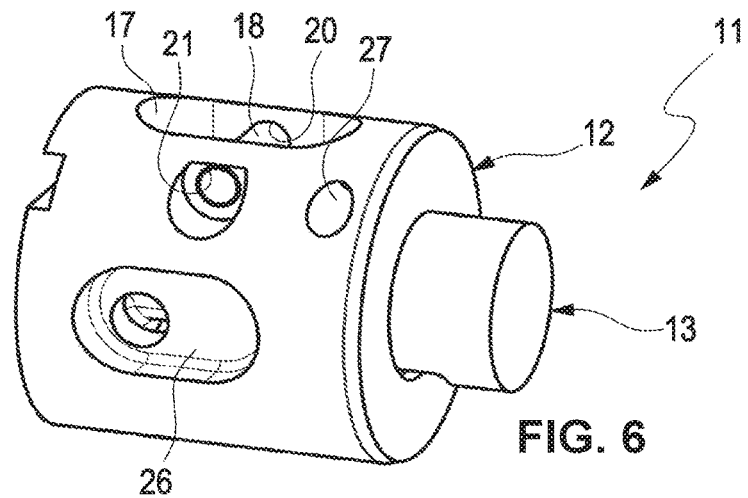
FIG. 6

(C-C)

"Z"

(A-A)

SWITCH VALVE FOR CONTROLLING A HYDRAULIC FLUID FLOW AND CONNECTING ROD FOR A VARIABLE COMPRESSION INTERNAL COMBUSTION ENGINE WITH A SWITCH VALVE

RELATED APPLICATIONS

This application claims priority from and incorporates by reference German patent applications
DE 10 2017 120 255.2 filed on Sep. 4, 2017, and
DE 10 2018 107 108.6 filed on Mar. 26, 2018.

FIELD OF THE INVENTION

The invention relates to a switch valve for controlling a hydraulic fluid flow, in particular for a connecting rod for a variable compression internal combustion engine with an eccentrical element adjustment arrangement for adjusting an effective connecting length. Furthermore, the invention relates to a connecting rod with the switch valve.

BACKGROUND OF THE INVENTION

In internal combustion engines a high compression ratio has a positive effect upon an efficiency of the internal compression engine. In internal combustion engines with external ignition, in particular gasoline engines that have a fixed compression ratio, the compression ratio, however, may only be selected high enough so that a so-called "knocking" of the internal combustion engine is prevented during full load operations. However, for much more prevalent partial load operations of the internal combustion engine, thus for a lower cylinder charge the compression ratio can be selected at a higher level without "knocking" occurring. The important partial load operations of an internal combustion engine can be improved when the compression ratio is variably adjustable. In order to adjust the compression ratio systems with variable connecting rod links are known which actuate an eccentrical adjustment arrangement of a connecting rod by hydraulically or mechanically actuatable switch valves.

A generic switch valve is described in DE 10 2012 112 462 A1. A tapping element of the switch valve element described therein is interlockable into switch valve positions by an interlocking ball and a spring, wherein the interlocking ball cooperates with two interlocking grooves configured in the tapping element. Reconfiguring the known switch valve is complex and expensive.

BRIEF SUMMARY OF THE INVENTION

Thus it is an object of the invention to provide an improved switch valve.

It is another object of the invention to provide a connecting rod with the improved connecting rod.

The object is achieved by a switch valve for controlling a hydraulic fluid flow, the switch valve comprising a tapping element that is arranged in a valve housing, wherein the tapping element is displaceable into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the tapping element is limited, wherein the interlocking element is at least partially arranged in a recess of the tapping element, wherein the valve housing includes a first groove that is oriented in an axial direction of the valve housing and limited in the axial direction, wherein the interlocking element is arranged axially displaceable in the first groove by the tapping element, and wherein the interlocking element cooperates with an interlocking pin which is arranged in the valve housing in a portion of the first groove.

Advantageous embodiments and advantages of the invention can be derived from the dependent claims, the description and the drawing figures.

According to an aspect of the invention a switch valve for controlling a hydraulic fluid flow is proposed including a tapping element that is arranged in a valve housing wherein the tapping element is optionally moveable into a first switching position or a second switching position and interlockable by spring loaded interlocking element in the first switching position or the second switching position. Thus, a first hydraulic connection is connected with a relief connection in the first switching position and a second hydraulic connection is connected with the relief connection in the second switching position, wherein a switch valve travel of the tapping element is limited. The interlocking element is at least partially arranged in a recess of the tapping element. The valve housing includes a first groove that is oriented in an axial direction and limited in the axial direction wherein the interlocking element is arranged axially moveable in the groove by the tapping element. Thus the tapping element cooperates with an interlocking pin which is arranged in the valve housing in a portion of the first groove.

The switch valve according to the invention is cost effective with respect to its engineering design and production. The spring loaded interlocking element advantageously does not run in the valve housing any more but in the tapping element itself. Thus, the spring element is predetermined with respect to its length by the interlocking element and by the tapping element. A complex interlocking contour is not required but can be replaced by an impressed cylindrical pin in the valve housing which is advantageously arranged perpendicular to an impression direction of the switch valve. The only thing that is still required is a precise borehole in the valve housing. A stop pin can be omitted since the interlocking element itself can be used as a stop.

The embodiment of the switch valve according to the invention is advantageous over the prior art where it is typical to impress a switch valve into a borehole in the connecting rod that is parallel to the connecting rod eyes. Thus, the pressed interconnection seals exterior grooves and boreholes at the switch valve relative to each other and prevents a hydraulic short circuit. Furthermore, the interconnection secures the switch valve against falling out in the axial direction. The pressed interconnection thus has to be configured so that a sufficiently sized impression force is always provided for all tolerances, wherein the impression force is approximately identical with an ejection force and also the material load limits are not exceeded. The maximum impression force is additionally reduced by the material loading during operations. It is most advantageous to arrange the switch valve in a portion that is loaded very little, like, e.g. above the connecting rod bolts which, however, is not always possible depending on engine geometry.

Depending on the engineering design of the crank drive, the switch valve can be arranged, e.g., centrally below the connecting rod in the connecting rod cover. Tension forces cause strong deformation at this location which can distort the bore hole for the switch valve as well, e.g. into an oval shape. Excessive impression forces can lead to material fatigue and thus cause plastic deformations by which the pressed interconnection is weakened during its service life. Worst case the switch valve can fracture, or the switch valve can fall out of the borehole. In both cases the engine will be damaged. Another negative effect under excessive combined load can be that the deformation binds the tapping element which is supported with a very tight tolerance in order to provide little leakage so that higher loads occur during the switching process.

Thus, according to the invention a transition fit, or a minor press fit can be used in combination with form locking between the valve housing and the connecting rod. In a transition fit it is advantageous when some clearance and thus leakage is provided between the valve housing and the connecting rod. The leakage can be kept to a minimum but advantageously has a rather small influence upon system properties due to the leakage point between the tapping element and the valve housing.

Thus, advantageously the interlocking pin can be jointly pressed through the valve cover as well as through the valve housing so that the switch valve is secured against falling out of the connecting rod cover. Advantageously there is only one pressed interconnection in the valve housing, whereas the interlocking pin has minimum clearance in the connecting rod cover. Thus, there are no additional tensions in the valve housing and tolerances with respect to concentricity of the boreholes can be compensated.

During assembly there is a situation where the switch valve cannot be preassembled any more since the interlocking pin can only be impressed after impressing the valve housing. Assembling the interlocking pin is thus performed after impressing the individual component of the valve housing. Therefore, at least one borehole is advantageously arranged in the connecting rod cover wherein the borehole facilitates pushing the interlocking element into the valve housing. Alternatively also a slotted hole groove can be provided.

In an alternative embodiment the switch valve can also be integrated in the connecting rod body directly instead of being integrated in the connecting rod cover.

According to another embodiment it is also possible to omit this additional borehole that is only required for assembly and to preassemble the switch valve with a temporary interlocking pin that does not protrude from the valve housing. The temporary interlocking pin can then be pushed out exclusively during impressing the long interlocking pin. The temporary interlocking pin can have a press fit, a transition fit or a slip fit.

In another embodiment the borehole for the interlocking pin can be a deadhole, which is advantageous with respect to residual contamination. Furthermore, the impression process can be facilitated in that it is performed to a stop and does not have to be monitored with respect to its travel.

According to an advantageous embodiment, the interlocking element can include an interlocking contour which facilitates at least two interlocking positions for the interlocking element in cooperation with the interlocking pin. This way it is easy to provide two switch valve positions of the switch valve in which the tapping element of the switch valve can be interlocked, and a hydraulic flow can be controlled by the switch valve.

According to an advantageous embodiment the interlocking element can include a spring element that is arranged in an interlocking sleeve. Thus, the interlocking element can be advantageously spring loaded. Mounting the interlocking element can be facilitated in a simple manner and the function of the spring effect of the interlocking element is safely provided. This way the spring element can also be advantageously protected against contamination which could degrade its function.

According to an advantageous embodiment the valve housing can include boreholes in a portion of the first groove wherein the interlocking pin is impressed into the boreholes. Additionally a boreholes can be provided in the valve housing and correspond with boreholes in the connecting rod cover. One or plural additional safety pins can be impressed into the boreholes after impressing the switch valve subassembly.

According to an advantageous embodiment, the interlocking element and the spring element arranged in the interlocking element can be arranged at least partially in a transversally arranged recess of the tapping element, wherein the valve housing includes a first groove that is oriented in an axial direction and axially limited wherein the interlocking element for limiting the switch valve travel and for providing rotation safety of the tapping element is arranged axially movable in the first groove. This way it is possible in a simple manner to provide two switch valve positions of the switch valve in which the tapping element of the switch valve can be interlocked so that a hydraulic flow through the switch valve can be controlled. This assures a reliable function of the switch valve.

According to an advantageous embodiment, the interlocking element can form a stop element that limits a displacement travel of the tapping element in the valve housing. This way an advantageous functional integration of the stop element into the tapping element is provided which simplifies fabrication and assembly of the switch valve.

According to another aspect of the invention, a connecting rod for a variable compression internal combustion engine is proposed, the connecting rod comprising an eccentrical element adjustment arrangement in the connecting rod cover for adjusting an effective connecting rod length. An adjustment travel of the eccentrical element adjust arrange is adjustable by a switch valve. Thus, a valve housing of the switch valve is axially secured by one or plural safety elements in a borehole of the connecting rod.

The safety according to the invention for the switch valve provided by one or plural safety elements in an axial direction in a borehole of the connecting rod is advantageous over the prior art, where it is typical to impress a switch valve into a borehole in the connecting rod that is introduced parallel to the connecting rod eyes. Thus, the pressed interconnection seals external grooves and boreholes at the switch valve relative to each other and prevents a hydraulic short. Furthermore, the pressed interconnection secures the switch valve against falling out in the axial direction. Thus, the pressed interconnection has to be configured so that all tolerances always provide a sufficient impressing force, wherein the impressing force is approximately identical to an extraction force and the material load limits are not exceeded. The maximum impression force is additionally reduced by the material loading during operations. It is most advantageous to arrange the switch valve in a portion that bears little load like, e.g., above connecting rod bolts, which is not always possible due to engine geometry.

Due to reasons in the engineering design of the crank drive the switch valve can thus be arranged centrally below the connecting rod in the connecting rod cover. Due to the tension forces there are strong deformations in this place which can also distort the boreholes for the switch valve into ovals. Excessive impression forces can lead to material fatigue and can thus cause plastic deformations by which the pressed interconnection is weakened over its service life. In a worst case scenario the switch valve can fracture, or the switch valve can fall out of the borehole. In both cases the engine would be damaged. Another negative effect of an excessive combined loading could be that the distortion binds the tapping element which is supported very closely in order to prevent leakage which causes higher loads in the shifting process.

Thus, according to the invention a transition fit, or a very slight press fit can be used in combination with form locking between the valve housing and the connecting rod. In case of a transition fit it is advantageous when clearance and thus leakage is thus possible between the valve housing and the connecting rod. The clearance can be kept to a minimum but can advantageously have a rather small influence upon system properties due to the leakage location between the tapping element and the valve housing.

Thus, advantageously an interlocking pin configured as the safety element can be pressed through the connecting rod cover and the valve housing. Advantageously there is only one pressed interconnection in the valve housing while the interlocking pin has minimum clearance in the connecting rod cover. This does not introduce additional tensions into the valve housing and tolerances with respect to concentricity of the boreholes can be compensated.

According to an advantageous embodiment the connecting rod and the valve housing can have boreholes into which one or plural safety pins are impressed forming safety elements. Impressing one or plural safety pins as safety elements, advantageously transversal to an impression direction of the switch valve, can advantageously provide that the switch valve is secured against falling out of the connecting rod cover.

According to an advantageous embodiment, the switch valve can be configured as described supra and can be advantageously used in the connecting rod cover without a seal. The pressed interconnection can thus seal external grooves and boreholes at the switch valve relative to each other and can prevent a hydraulic short. Since the assembly is provided in a pressed interconnection an additional seal can be omitted.

According to an advantageous embodiment the interlocking pin can be provided as a safety pin and provide additional axial safety of the switch valve in the connecting rod. This advantageously prevents to have to provide an additional safety pin which simplifies production and assembly of the connecting rod.

According to an advantageous embodiment a borehole can be provided in the connecting rod cover to mount the interlocking element in the valve housing of the switch valve. Thus the interlocking element can be mounted in a simple manner into the valve housing or the tapping element of the switch valve through the borehole in the connecting rod cover.

According to an advantageous embodiment the boreholes can be provided as dead holes which is advantageous with respect to residual contamination. Furthermore the impression process can simplified in that the impression process can be performed until a stop is hit and does not have to be monitored with respect to impression travel.

According to an advantageous embodiment the boreholes can have a slip fit in which one or plural safety pins can be secured by deformation against dropping out. Thus, the safety pins can be secured in a simple manner. The deformation can be provided, e.g., in a simple manner by flanging ends of the safety pins or by similar suitable processes.

According to an advantageous embodiment the valve housing can be fixed at the connecting rod cover by a face weld forming the safety element. Advantageously a transition fit can be provided for the impression process of the switch valve into the connecting rod cover. A weld at one or two faces of the switch valve and at the connecting rod cover permanently fixes the switch valve in the connecting rod cover.

BRIEF DESCRIPTION OF THE DRAWINGS

Further advantages can be derived from the subsequent drawing description. The drawing illustrate an embodiment of the invention. The drawings, the description and the claims include several features in combination. A person skilled in the art will advantageously view the features also individually and will combine them into additional useful combinations, wherein:

FIG. 4 illustrates a longitudinal sectional view through the switch valve in the sectional plane A-A according to FIG. 3;

FIG. 5 illustrates another longitudinal sectional view through the switch valve in the sectional plane according to FIG. 3;

FIG. 6 illustrates an isometric view of the switch valve according to FIG. 3;

DETAILED DESCRIPTION OF THE INVENTION

Figure 1:
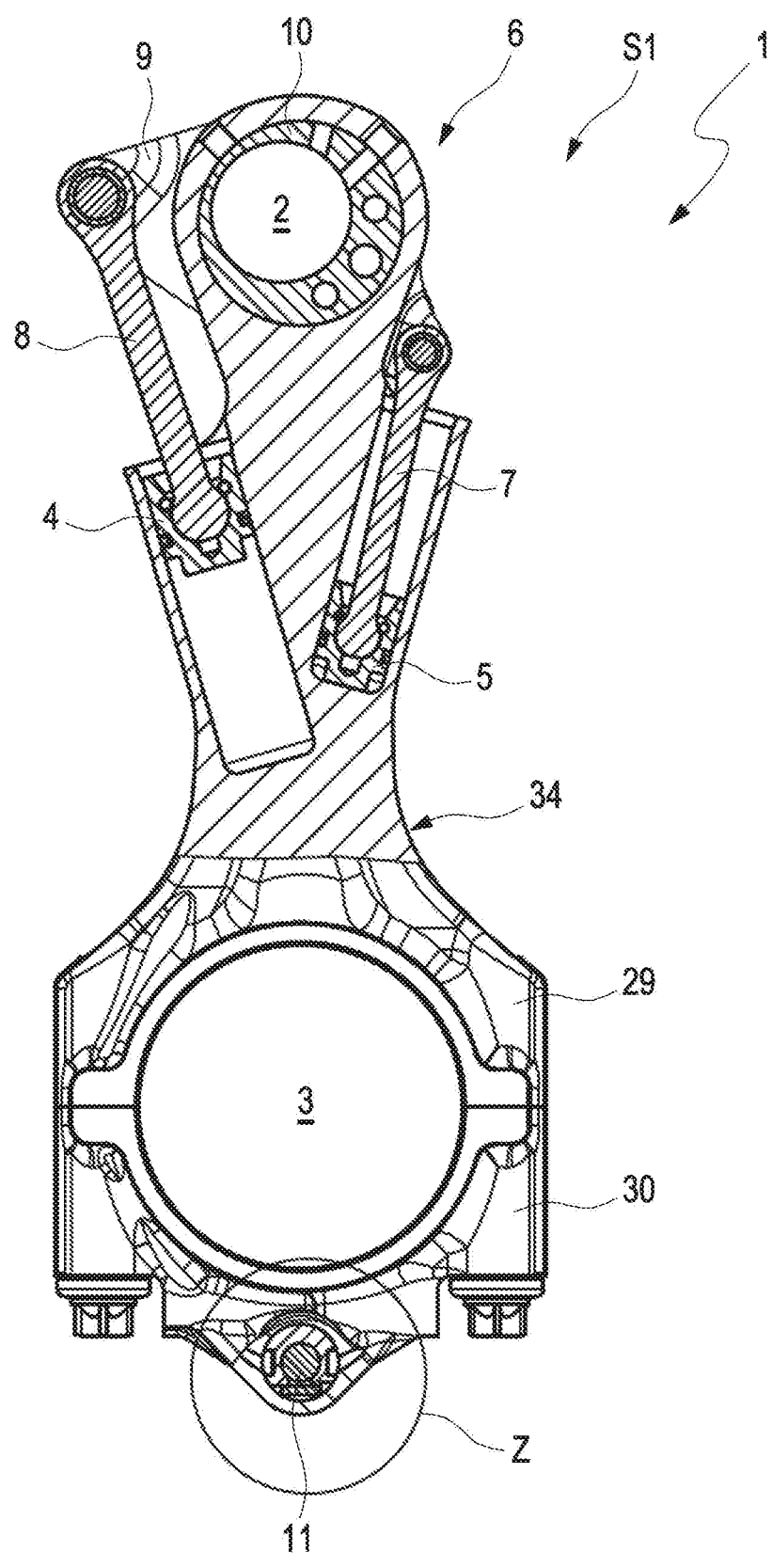
FIG. 1 illustrates a longitudinal sectional view through a first embodiment of a connecting rod according to the invention.

In the drawing figures identical or like components are labelled with identical reference numerals. The figures only illustrate exemplary embodiments and do not limit the scope of the invention.

FIGS. 2 through 12 illustrate various views and sectional views of a first embodiment of a switch valve 11 according to the invention, or of components of the switch valve 11 which is provided in particular for a known connecting rod 1 for a variable compression internal combustion engine that is illustrated in FIG. 1.

The connecting rod 1 illustrated in FIG. 1 includes a rod element 34, including a connecting rod body 29, a connecting rod cover 30 and an eccentrical element adjustment arrangement 6 with an eccentrical element 10 that is at least partially arranged in a connecting rod bearing eye. The eccentrical element adjustment arrangement 6 adjusts an effective connecting rod length. A connecting rod length is a distance of a center axis of a crank bearing eye 3 from a center axis of a connecting rod bearing eye 2.

A relative rotation of the adjustable eccentrical element adjustment arrangement 6 is initiated by an impact of mass and load forces of the internal combustion engine which impact the eccentrical element adjustment arrangement 6 during an operating stroke of the internal combustion engine. During an operating stroke effective directions of forces impacting the eccentrical element adjustment arrangement 6 change continuously. The rotation movement or adjustment movement is supported by pistons 4, 5 that are loaded with hydraulic fluid, in particular motor oil, and which are integrated in the connecting rod 1. The pistons 4, 5 prevent a reset of the eccentrical element adjustment arrangement 6 due to varying force effective directions of forces impacting the eccentrical element adjustment arrangement 6.

The pistons 4, 5 are operatively connected by eccentrical element rods 7, 8 on both sides with a lever 9 of the eccentrical element adjustment arrangement 6. The pistons 4, 5 are movably arranged in hydraulic chambers and loaded through non-illustrated hydraulic fluid conduits through non-illustrated check valves. Thus the check valves prevent a flowback of the hydraulic fluid from the hydraulic chambers into the hydraulic fluid conduits and thus facilitate a pulling of hydraulic fluid into the hydraulic chambers. The hydraulic fluid conduits that are connected with the hydraulic chambers cooperate in their entirety or at least partially with the switch valve 11 according to the invention. In a first switching position S1 of the switch valve 11 which corresponds to a position with high compression of the connecting rod 1 (illustrated in FIG. 1), the first hydraulic chamber is connected with a non-illustrated relief conduit, and in a second hydraulic chamber is connected with the relative conduit in a second switch valve position S2 of the switch valve 11 which corresponds to a low compression position of the connecting rod 1. Thus, the relief conduit establishes a connection to a supply of the connection rod 1 with hydraulic fluid, e.g., through a groove in the crank bearing eye 3 of the connecting rod 1.

The subsequently described switch valve 11, however, can also be provided for any other connecting rod for a variable compression combustion engine which includes an eccentrical element adjustment arrangement for adjusting an effective connecting rod length and at least one hydraulic chamber. For example, the eccentrical element adjustment arrangement of the connecting rod can be configured with a so-called pivot motor system.

Figure 2:
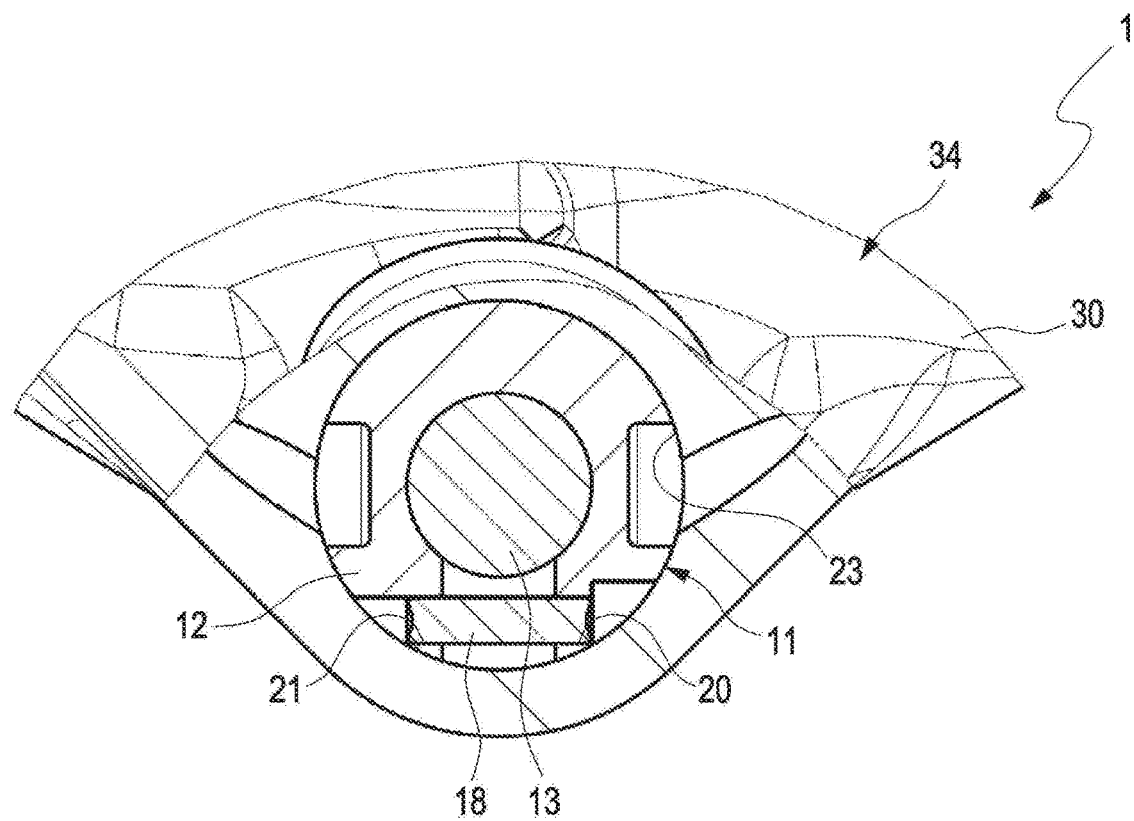
FIG. 2 illustrates a blown-up detail Z of the longitudinal section view according to FIG. 1 with emphasis on the switch valve in a cross-sectional view.
Figure 3:
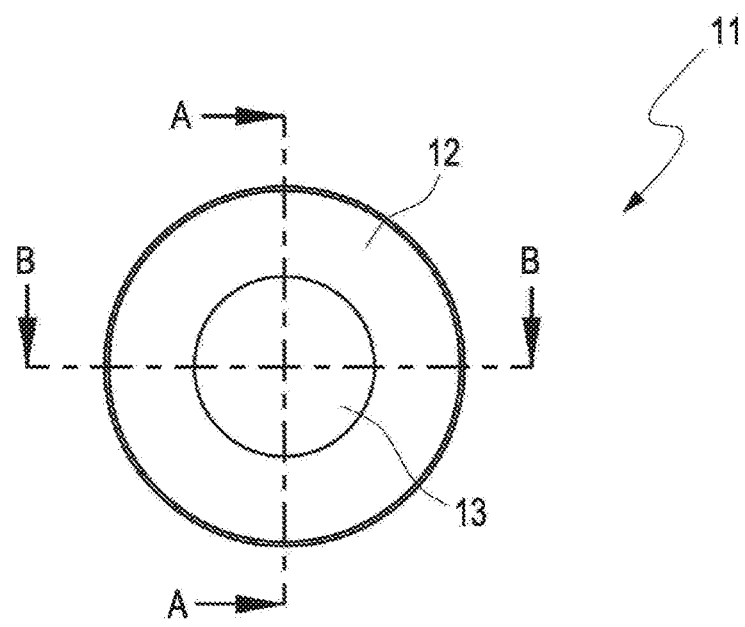
FIG. 3 illustrates a top view of the switch valve according to an embodiment of the invention with drawn in sectional planes A-A and B-B.

The switch valve 11 is illustrated in FIG. 2 in an enlarged detail Z of the connecting rod 1 in a cross-sectional view. FIG. 3 illustrates a top view of the switch valve 11 with illustrated sectional planes A-A and B-B. FIG. 4 illustrates a longitudinal sectional view through the switch valve 11 in the section plane A-A, whereas FIG. 5 illustrates a longitudinal sectional view in the sectional plane B-B.

As evident from FIG. 2, the switch valve 11 is axially arranged in a borehole 23 of the connecting rod 1, e.g., impressed. In order to mount the switch valve 11 without a seal in the connecting rod 34 or a connecting rod body 29 or connecting rod cover 30 the valve housing 12 of the switch valve 11 can be axially secured by one or plural safety pins in the borehole 23 of the connecting rod 1. The one or plural safety pins cannot be derived from the sectional view in FIG. 2 since the safety pin is arranged in another sectional plane.

Figure 14:
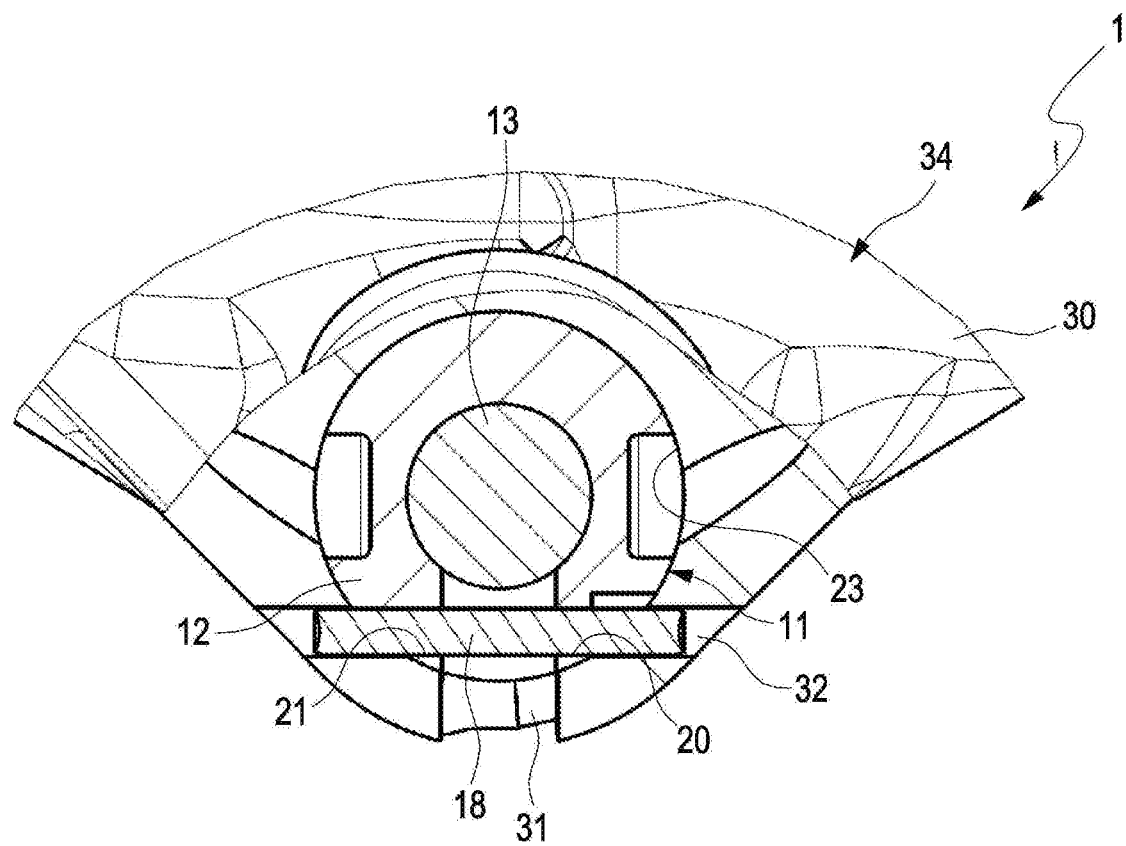
FIG. 14 illustrates an enlarged detail Z of a longitudinal sectional view according to FIG. 13 with focus on the switch valve in a cross sectional view.

In order to receive the non-illustrated safety pin the connecting rod 1 includes boreholes 32 which are illustrated in the second embodiment in FIG. 14, whereas the valve housing 12 includes corresponding boreholes 27 (illustrated in FIG. 9) into which a safety pin can be impressed. The boreholes 32 of the connecting rod 1 are configured, e.g., as pass-through boreholes to simplify fabrication.

In the cross sectional view of FIG. 2 the valve housing 12 of the switch valve 11 that is impressed into the borehole 23 of the connecting rod cover is illustrated with the internally supported tapping element 13. The interlocking pin 18 is arranged in the boreholes 20, 21 transversal to the axis of the valve housing 12.

In the cross sectional view of the switch valve 11 in FIG. 4, furthermore, the two hydraulic connections 22, 24, are arranged which are respectively associated with the supply of the hydraulic chambers of the mass force side (MKS) or the gas force side (GKS) of the adjustment arrangement 6 of the connecting rod 1 and which correspond to the switching positions S1 and S2. The cross section of FIG. 5 illustrates the relief connections 26 which are connected with the hydraulic supply P.

The switch valve 11 includes a tapping element 13 which is arranged in the valve housing 12 wherein the tapping element 13 is movably arranged in an axial direction L (FIG. 4) between a first switching position S1 and a second switching position S2 and which is interlockable by a spring loading interlocking element 14 in the first switching position S1 or the second switching position S2. Thus, the interlocking element 14 includes a spring element 15 that is arranged in an interlocking sleeve 33. In the first switching position S1 a first hydraulic connection 22 of the switch valve 11 is connected with a relief connection 26, and in the second switching position S2 a second hydraulic connection 24 is connected with the relief connection 26 as evident in part from FIG. 4.

The tapping element 13 that is arranged in the valve housing 12 is optionally interlockable in the first switching position S1 or the second switching position S2. For this purpose the interlocking element 14 and the spring element 15 that is arranged in the interlocking element 14 are at least partially arranged in a transversally arranged recess 16 of the tapping element 13. Thus, the valve housing 12 includes a first groove 17 that is axially limited in the axial direction L wherein the interlocking element 14 is arranged axially movable in the first groove 17 in order to limit the shift travel and to provide rotation safety for the tapping element 13. The at least partial arrangement of the interlocking element 14 in the recess 16 is advantageous since the support length of the movable interlocking element 14 can be significantly increased compared to the known switch valves. A wedging propensity and a self-hemming propensity can be reduced and reliably reaching the end positions out of its own force can be improved. Thus, the spring configuration of the spring element 15 is non-critical due to the larger installation length compared to the prior art.

The interlocking element 14 serves as an additional stop element which limits a movement travel of the stop element 13 in the valve housing 12. Thus, the stop element 13 can be omitted as an additional component. The interlocking element 14 is provided axially displaceable together with the tapping element 13. The interlocking element 14 cooperates with the interlocking pin 18 which is arranged in the valve housing 12 in the portion of the first groove 17.

In order to arrest the switch valve 11 in the two switching positions S1 and S2 the interlocking element 14 includes an interlocking contour 19 which facilitates two interlocking positions for the interlocking element 14 in cooperation with the interlocking pin 18. As illustrated in FIG. 4 the interlocking element 14 with its interlocking contour 19 can interlock on both sides of the interlocking pin 18 when axially moving the tapping element 13.

Figure 7:
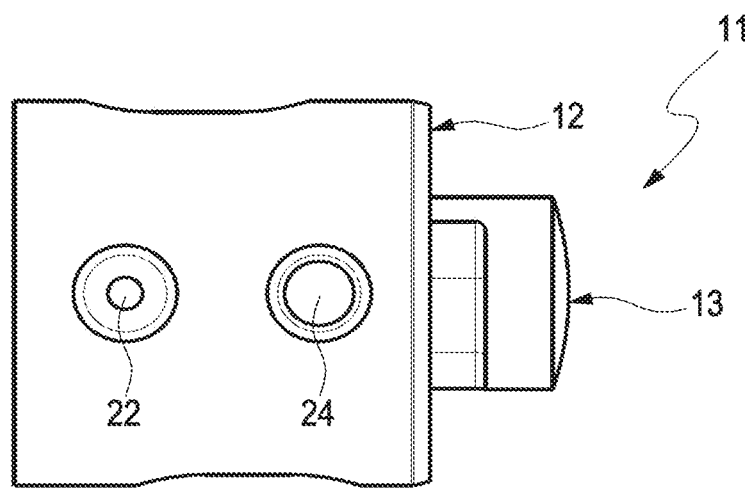
FIG. 7 illustrates a side view of the switch valve according to FIG. 3.
Figure 8:
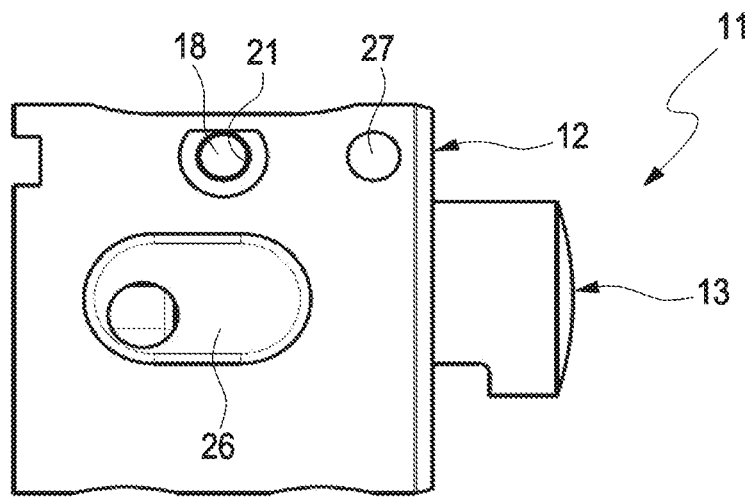
FIG. 8 illustrates another side view of the switch valve according to FIG. 3.
Figure 9:
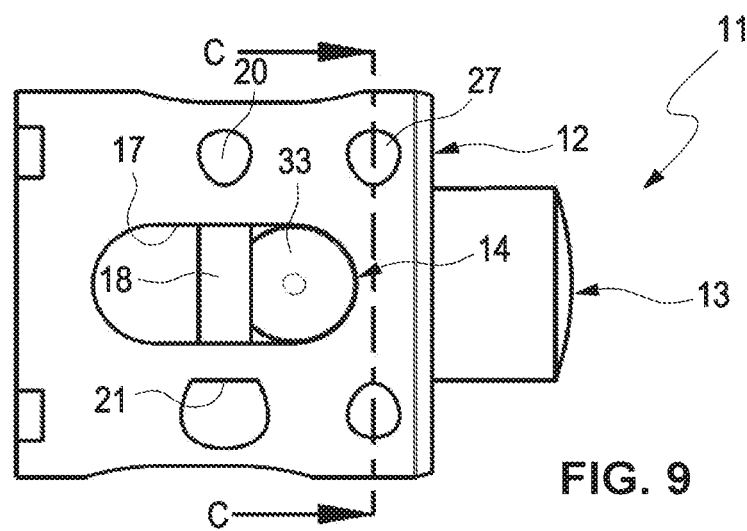
FIG. 9 illustrates another side view of the switch valve according to FIG. 3 with a drawn in sectional plane C-C.
Figure 10:
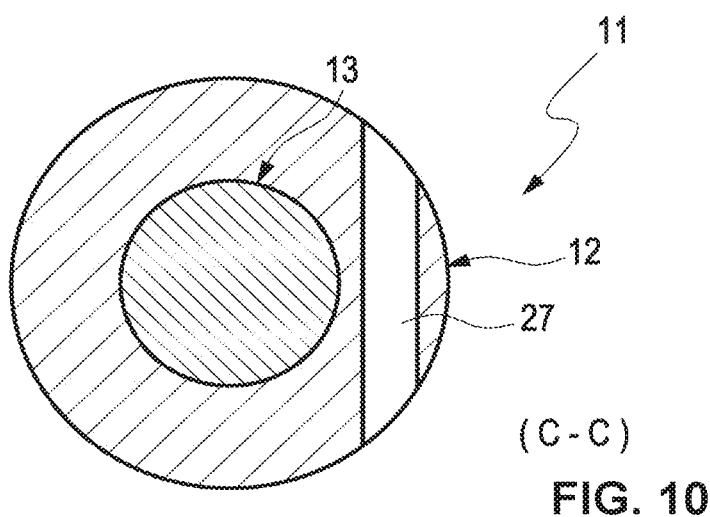
FIG. 10 illustrates cross-sectional view of the switch valve in the sectional plane C-C according to FIG. 9.
Figure 11:
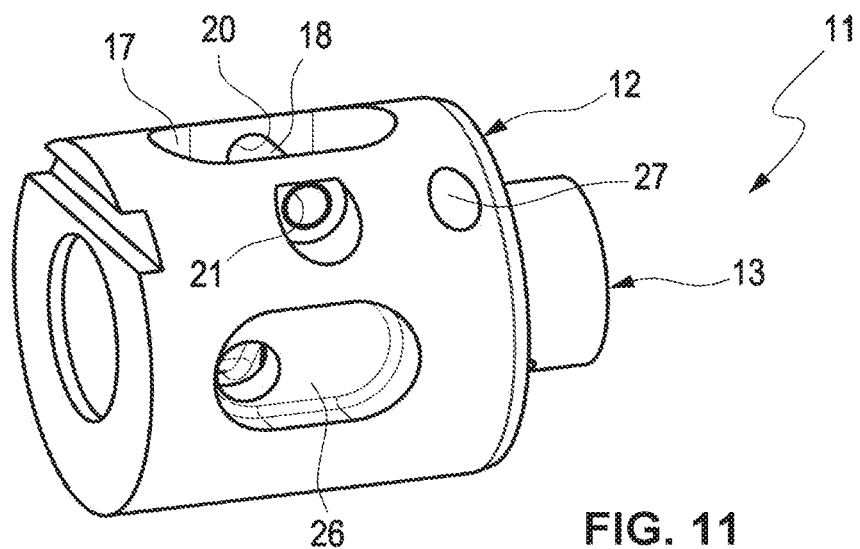
FIG. 11 illustrates another isometric view of the switch valve according to FIG. 3.
Figure 12:
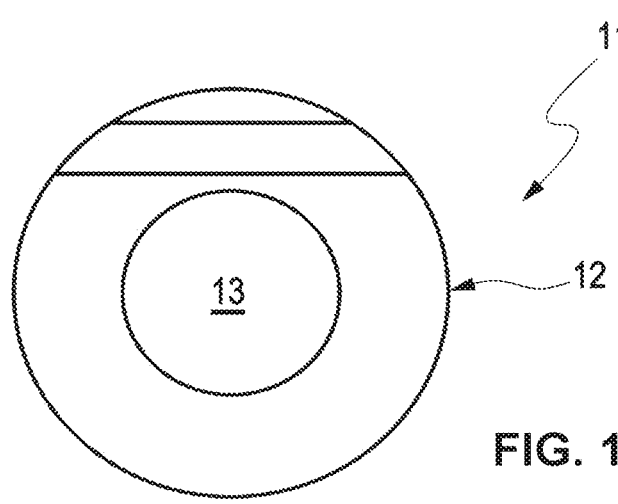
FIG. 12 illustrates a top view of the switch valve according to FIG. 3.

FIG. 6 illustrates an isometric view of the switch valve 11 according to FIG. 3, whereas FIGS. 7,8 and 9 illustrate various side views of the switch valve 11. FIG. 9 illustrates a sectional plane C-C and its cross section of the switch valve 11 is illustrated in FIG. 10. FIG. 11 illustrates another isometric view of the switch valve 11 and FIG. 12 illustrates a top view of the switch valve 11.

As evident from FIG. 6 the valve housing 12 includes boreholes 20, 21 in a portion of the first groove 17, wherein the interlocking pin 18 is impressed into the boreholes. The relief connection 26 is also visible.

The side view in FIG. 7 illustrates the arrangement of the two hydraulic connections 22, 24, whereas FIG. 8 illustrates the relief connection 26 configured as a slotted hole.

In order to receive a safety pin the connection rod 1 includes boreholes 32 as illustrated in the embodiment in FIG. 14, whereas the valve housing 12 illustrates corresponding boreholes 27 (illustrated in FIG. 9) into which a safety pin can be inserted. In order to simplify production the boreholes 32 of the connecting rod 1 are configured for example as pass through boreholes.

A borehole of the connecting rod 1 can be alternatively configured as a dead hole which helps to avoid residual contamination. Furthermore, the impressing process can be simplified in that an impressing travel does not have to be monitored any more.

FIG. 9 furthermore shows the interlocking pin 18 through the groove 17.

FIGS. 13-17 show another embodiment of a connecting rod 1 according to the invention which differs in that the interlocking pin 18 additionally serves as a safety pin. The interlocking pin 18 functioning as a safety pin is thus acting as an axial safety of the switch valve 11 in the connecting rod 1.

Figure 13:
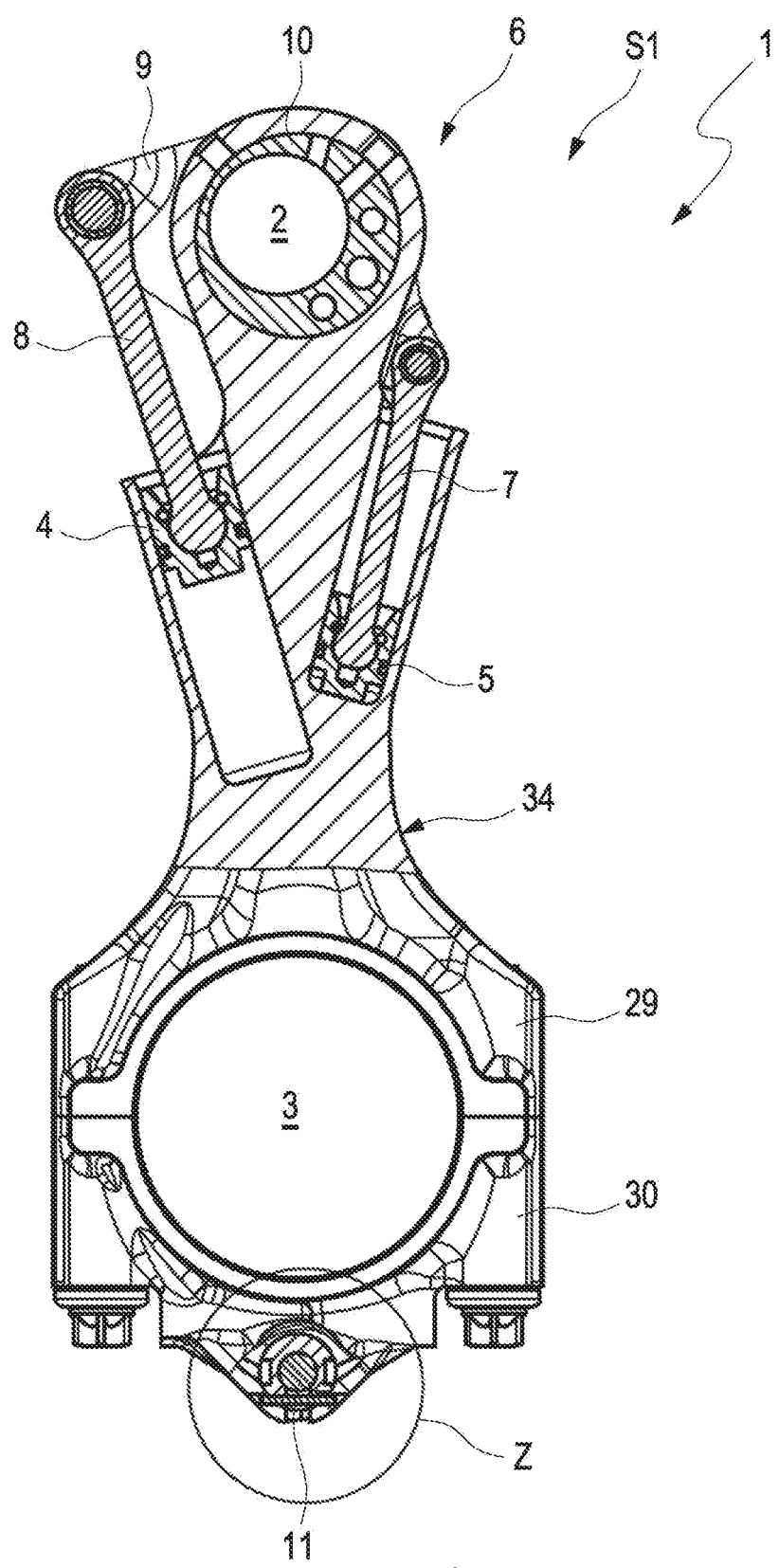
FIG. 13 illustrates a longitudinal sectional view through another embodiment of a switch valve according to the invention.

FIG. 13 illustrates a long sectional view through the connecting rod 1, whereas FIG. 14 illustrates an enlarged detail Z of the long sectional view according to FIG. 13 with a focus on the switch valve 11 in a cross sectional view.

Figure 15:
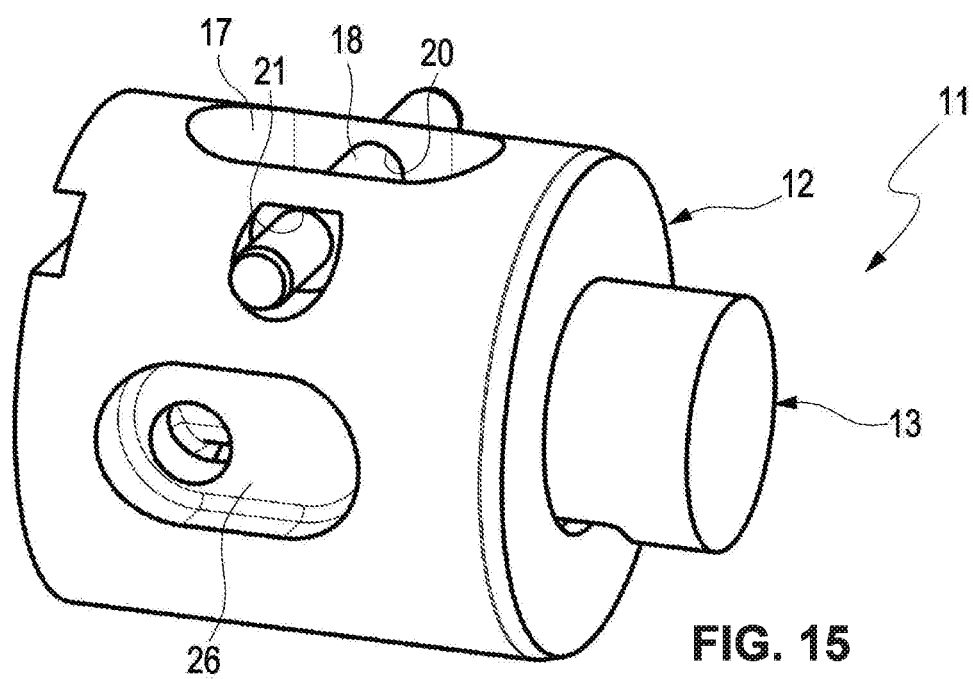
FIG. 15 illustrates an isometric view of the switch valve according to FIG. 13.
Figure 16:
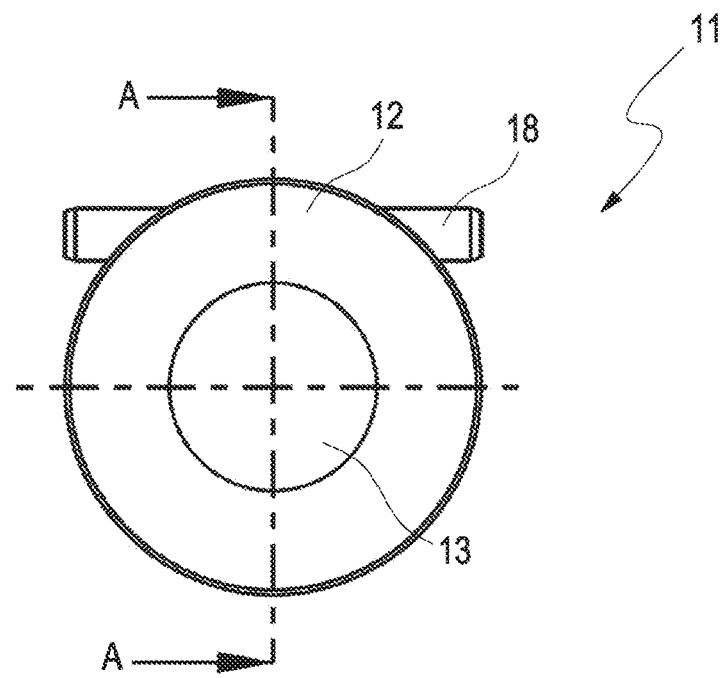
FIG. 16 illustrates a top view of the switch valve according to FIG. 13 with a sectional plane A-A drawn; and, FIG. 17 illustrates a long sectional view through the switch valve in the sectional plane A-A according to FIG. 16.
Figure 17:
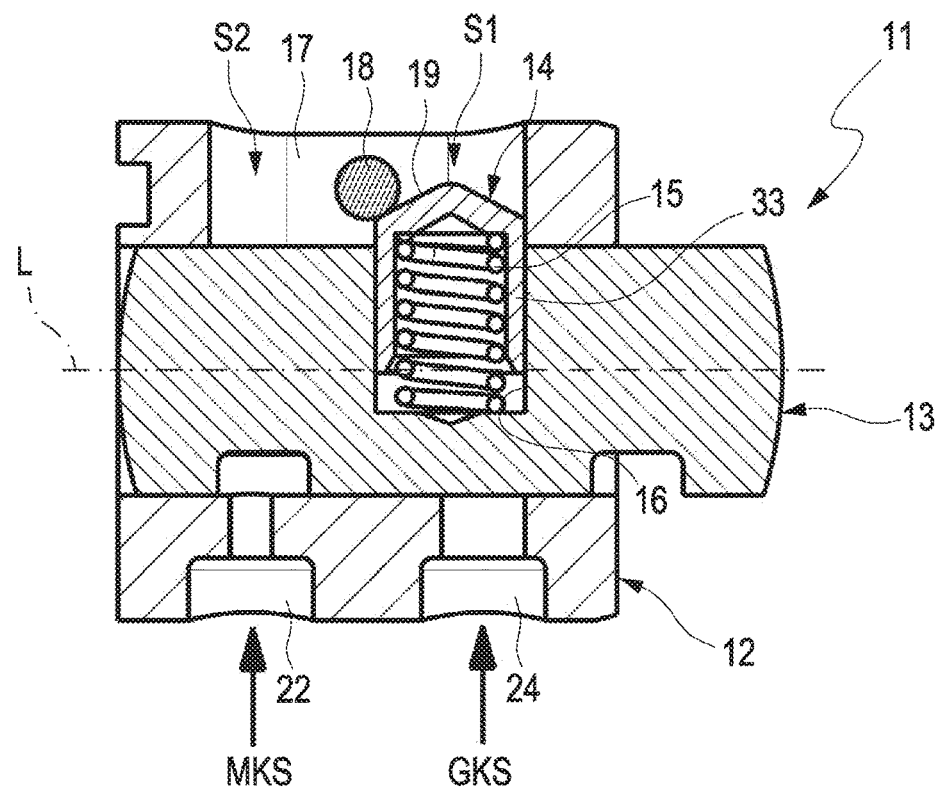

FIG. 15 illustrates an isometric view of the switch valve 11 according to FIG. 13. FIG. 16 illustrates a top view of the switch valve 11 with a drawn sectional plane A-A, whereas FIG. 17 illustrates a longitudinal view through the switch valve 11 in the sectional plane A-A.

As can be derived in particular from the blown up detail in FIG. 14, the interlocking pin 18 is pressed through the connecting rod cover 30 and through the valve housing 12. Thus, the connecting rod cover 30 includes a borehole 32, advantageously a pass through borehole through which the interlocking pin 18 is insertable as a safety element and can be run through boreholes 20, 21 in the valve housing 12. When the interlocking pin 18 has sufficient length the interlocking 18 can protrude on both sides beyond the valve housing 12 so that the interlocking pin is anchored as a safety element in the borehole 32 of the connect rod cover 30. Advantageously only one pressed interconnection is arranged in the valve housing 12, whereas the interlocking pin 18 has a minimal clearance in the connecting rod cover 30. Thus, no additional tensions are introduced into the valve housing 12 at this location. Tolerances with respect to concentricity of the boreholes 32 in the connecting rod cover 30 and of the boreholes 20, 21 in the valve housing 12 can be compensated.

Alternatively the boreholes 32 can also be provided as dead holes. The boreholes 32 can advantageously have a slip fit in which one or plural safety pins are secured against falling out, e.g., by shaping their ends, e.g., by flanging.

For assembly this presents a situation where the switch valve 11 cannot be preassembled any more since the interlocking pin 18 is only impressed after impressing the valve housing 12. Assembling the interlocking 18 is therefore only performed after impressing the valve housing 12 into the borehole 23 in the connecting rod cover 30. Therefore, at least one borehole 31 is advantageously introduced into the connecting rod cover 30 wherein the interlocking element 14 can be advantageously introduced into the valve housing 12 through the borehole 31. Alternatively a slotted hole groove is conceivable.

In an alternative embodiment a temporary interlocking pin can be mounted in the valve housing 12 wherein the temporary interlocking pin does not protrude from valve housing 12 and is ejected by the permanent interlocking pin 18 during assembly. The temporary interlocking pin can have a press fit, a transition fit or a slip fit.

In an alternative embodiment the valve housing 12, however, can also be fixated by a face weld as a safety element at the connection rod cover 30.

In the isometric illustration of FIG. 15 an interlocking pin 18 is visible which is longer than the interlocking pin 18 of the preceding embodiment, wherein the interlocking pin of FIG. 15 transversally penetrates the valve housing 12 and protrudes on both sides beyond valve housing 12. The relief connection 26 is also evident. The length of the interlocking pin 18 can also be derived from the top view of FIG. 16

FIG. 17 illustrates a longitudinal sectional view of the switch valve which essentially corresponds to the illustration of the first embodiment in FIG. 4. The difference is that no additional boreholes 27 are required to attach an additional safety pin so that fabrication of the valve housing 12 is simplified.

What is claimed is:

1. A connecting rod for a variable compression internal combustion engine, the connecting rod comprising:
   an eccentrical element adjustable arrangement arranged in a connecting rod body and configured to adjust an effective connecting rod length,
   wherein an adjustment travel of the eccentrical element adjustment arrangement is adjustable by a switch valve,
   wherein a valve housing of the switch valve is axially secured in a borehole of the connecting rod by at least one safety element, and
   wherein the connecting rod and the valve housing include first boreholes into which one or plural safety pins are impressed to form the at least one safety element.

2. The connecting rod according to claim 1,
   wherein the switch valve includes a tapping element that is arranged in a valve housing,
   wherein the tapping element is displaceable into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the tapping element is limited, wherein the spring loaded interlocking element is at least partially arranged in a recess of the tapping element, wherein the valve housing includes a first groove that is oriented in an axial direction of the valve housing and limited in the axial direction, wherein the spring loaded interlocking element is arranged axially displaceable in the first groove by the tapping element, and wherein the spring loaded interlocking element cooperates with an interlocking pin which is arranged in the valve housing in a portion of the first groove, wherein the switch valve is inserted into a connecting rod cover without a seal.

3. The connecting rod according to claim 2, wherein the interlocking pin is provided as a safety pin that provides additional axial safety for the switch valve in the connecting rod.

4. The connecting rod according to claim 3, wherein a second borehole is provided in the connecting rod cover for mounting the spring loaded interlocking element in the valve housing of the switch valve.

5. The connecting rod according to claim 1, wherein the first boreholes are provided as dead holes.

6. The connecting rod according to claim 1, wherein the first boreholes have a slip fit in which the one or plural safety pins are secured by forming against dropping out.

7. The connecting rod according to claim 1, wherein the valve housing is fixed at the connecting rod cover by a weld forming a safety element.

8. A connecting rod for a variable compression internal combustion engine, the connecting rod comprising:

an eccentrical element adjustable arrangement arranged in a connecting rod body and configured to adjust an effective connecting rod length, wherein an adjustment travel of the eccentrical element adjustment arrangement is adjustable by a switch valve for controlling a hydraulic fluid flow, the switch valve including:

a tapping element that is arranged in a valve housing, wherein the tapping element is displaceable in an axial direction of the valve housing into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the tapping element is limited, wherein the spring loaded interlocking element is at least partially arranged in a recess of the tapping element, wherein the valve housing includes a first groove that is oriented in the axial direction of the valve housing and limited in the axial direction, wherein the spring loaded interlocking element is arranged axially displaceable in the axial direction in the first groove and axially displaceable together with the tapping element, and wherein the spring loaded interlocking element cooperates with an interlocking pin which is arranged in the valve housing in a portion of the first groove.

9. The connecting rod according to claim 8, wherein the spring loaded interlocking element includes an interlocking contour which facilitates at least two interlocking positions for the spring loaded interlocking element in cooperation with the interlocking pin.

10. The connecting rod according to claim 8, wherein the spring loaded interlocking element includes a spring element that is arranged an interlocking sleeve.

11. A connecting rod for a variable compression internal combustion engine, the connecting rod comprising:

an eccentrical element adjustable arrangement arranged in a connecting rod body and configured to adjust an effective connecting rod length, wherein an adjustment travel of the eccentrical element adjustment arrangement is adjustable by a switch valve for controlling a hydraulic fluid flow, the switch valve including:

a tapping element that is arranged in a valve housing, wherein the tapping element is displaceable into a first switching position or a second switching position and interlockable by a spring loaded interlocking element in the first switching position or the second switching position, wherein a first hydraulic connection is connected with a relief connection in the first switching position and a second hydraulic connection is connected with the relief connection in the second switching position, wherein a switching travel of the tapping element is limited, wherein the spring loaded interlocking element is at least partially arranged in a recess of the tapping element, wherein the valve housing includes a first groove that is oriented in an axial direction of the valve housing and limited in the axial direction, wherein the spring loaded interlocking element is arranged axially displaceable in the first groove by the tapping element, and wherein the spring loaded interlocking element cooperates with an interlocking pin which is arranged in, the valve housing in a portion of the first groove, wherein the valve housing includes boreholes in a portion of the first groove, and wherein the interlocking pin is impressed into the boreholes.

12. The connecting rod according to claim 10, wherein the spring loaded interlocking element and the spring element are at least partially arranged in a transversal recess of the tapping element, and wherein the spring loaded interlocking element is arranged axially displaceable in the first groove to limit a switching travel of the tapping element and to secure the tapping element against rotation.

13. The connecting rod according to claim 8, wherein the spring loaded interlocking element functions as a stop element and limits a displacement travel of the tapping element in the valve housing.

* * * * *